June 23, 1925. 1,543,089
J. BARDWELL ET AL
PICKER STEM
Filed June 17, 1924
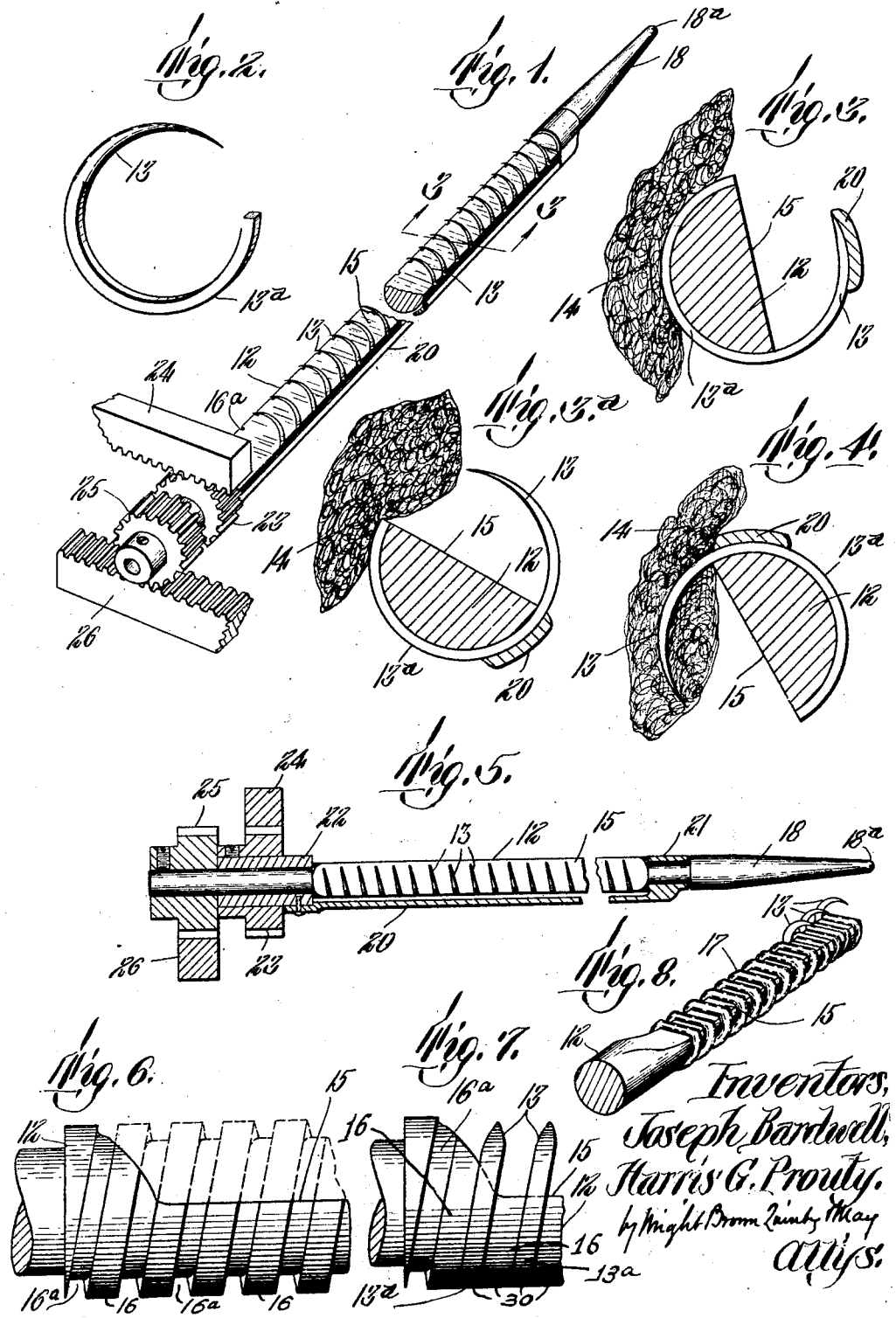

Patented June 23, 1925.

1,543,089

UNITED STATES PATENT OFFICE.

JOSEPH BARDWELL AND HARRIS G. PROUTY, OF WHITMAN, MASSACHUSETTS.

PICKER STEM.

Application filed June 17, 1924. Serial No. 720,550.

*To all whom it may concern:*

Be it known that we, JOSEPH BARDWELL and HARRIS G. PROUTY, citizens of the United States, residing at Whitman, in the county of Plymouth and State of Massachusetts, have invented new and useful Improvements in Picker Stems, of which the following is a specification.

This invention relates to the element of a cotton picking machine known as a picker stem. A picking machine of which the stem of our invention is an element includes a wheeled vehicle movable in a cotton field, and supporting a plurality of elongated picker stems and mechanism for longitudinally reciprocating the stems and for turning the same on their longitudinal axes, the arrangement being such that each stem may be projected lengthwise to bear on the surface of a cotton boll in its path of movement, partly rotated in one direction on its longitudinal axis when projected, retracted lengthwise while thus turned, and partly rotated in the opposite direction when fully retracted.

The invention is embodied in the improved stem construction hereinafter described, whereby first the stem, while being projected, runs or slides on the surface of a boll without engaging the fibers thereof and exerts lateral pressure on the boll; secondly, the stem, when fully projected, is partly rotated in one direction on its longitudinal axis to cause arcuate hooks forming members of the stem to impale a portion of the boll; thirdly, the stem is retracted while the boll is impaled, to strip the boll from its stalk; and fourthly, the stem is rotated in the opposite direction after its retraction to withdraw the hooks and release the boll.

Of the accompanying drawings forming a part of this specification,—

Figure 1 is a perspective view of a picker stem embodying the invention, portions being broken away.

Figure 2 is a perspective view showing one of the arcuate hooks much enlarged.

Figure 3 is an enlarged section on line 3—3 of Figure 1, showing the stem in position to slide or run on a boll.

Figure 3ª is a view similar to Figure 3 showing the stem with its hooks in position to enter a boll.

Figure 4 is a view similar to Figures 3 and 3ª showing the boll impaled by the hooks.

Figure 5 shows the stem in side elevation and the stripper hereinafter described in section.

Figure 6 is an enlarged fragmentary side elevation showing a portion of the rod member of the stem without the hooks.

Figure 7 is a view similar to Figure 6 showing hooks secured to the rod member.

Figure 8 is a fragmentary perspective view of a portion of the stem, showing a modification of the construction, whereby the alternating ridges and grooves, hereinafter described, are formed.

The same reference characters indicate the same parts in all of the figures.

Our improved picker stem comprises an elongated rod 12, adapted to be reciprocated or projected and retracted lengthwise, and turned on its longitudinal axis, and a plurality of arcuate pointed hooks 13 fixed to the rod and adapted to impale a cotton boll 14, as shown by Figure 4, when the rod is turned in one direction on its axis, and to release the boll, as shown by Figure 3, when the rod is turned in the opposite direction.

The major portion of the rod has a substantially semi-cylindrical side which includes alternating spaced apart arcuate rigdes 16 and arcuate grooves 16ª (Figures 6), and a substantially flat side 15 intersecting the semi-cylindrical side. The arcuate hooks 13 are separately formed and are provided with arcuate shanks 13ª, secured as by brazing or soldering in the grooves 16ª. The hooks 13 are pointed and overhang the flat side 15. The shanks 13ª and the ridges 16 collectively form a substantially semi-cylindrical runner portion designated by 30 in Figure 7.

The arrangement is such that when the runner portion bears on a boll, as in Figure 3, the pointed hooks are out of contact with the boll, and when the stem is turned to separate the runner portion from the boll, as in Figure 4, the hooks impale the boll.

The shanks 13ª are preferably square in cross section, as indicated by Figure 2, so that their outer sides are flush with the ridges 16, as shown by Figure 7 and constitute parts of the runner surface. The grooves 16ª may be parts of a continuous helical groove formed in the rod before one side of the latter is cut away to form the face 15, the rod as it appears before it is thus cut away, being shown by full and dotted lines in Figure 6. If desired, however, the grooves may be otherwise formed, for example by helically winding a length 17 of wire on the rod, as shown by Figure 8, the convolutions of the wire being spaced apart and forming the ridges and the sides of the shank-receiving grooves. The wire may be either square or round in cross section. In this modification, the wire 17 and the hook shanks 13$^a$ form the semi-cylindrical surface of the runner portion of the stem. The ridges and grooves in each of the illustrated embodiments are inclined or oblique relatively to the longitudinal axis of the rod, so that the hooks stand in correspondingly inclined or oblique planes, their arrangement being such that their points are farther from the outer end of the stem than the shank portions, and will not catch the fibers of a boll adjacent to the one they are intended to engage when the stem is being projected lengthwise, the hooks having a backward rake or inclination causing them to slip on an adjacent boll without catching the fibers thereof.

The rod 12 is provided with a tapered extension or nose portion 18 coaxial with the rod and having a blunt or rounded end 18$^a$. When the stem is projected lengthwise into a cotton plant, the nose portion contacts with a boll without penetrating it, and by reason of its tapered form, slightly deflects or displaces the boll bodily and enables the runner portion following the nose position to exert lateral pressure on the boll, so that a portion of the boll is in the path in which the hooks move when the stem is turned to the position shown by Figure 4. The stem preferably includes a stripper bar 20 extending lengthwise of the stem and oscillatable on the rod, so that it is adapted to alternately expose the hooks and cover the pointed end portions thereof. The stripper bar is fixed at its outer end to a sleeve 21 journalled on a reduced outer portion of the rod, and at its inner end to a sleeve 22 journalled on a reduced inner portion of the rod. The bar may be oscillated on the rod by any suitable means, such as a pinion 23 fixed to the sleeve 22, and a rack 24 meshing with the pinion. The stem may be turned on its longitudinal axis by any suitable means, such as a pinion 25 fixed to the rod, and a rack 26 reciprocated by the mechanism of the machine and meshing with the pinion. Any suitable mechanism may be provided for longitudinally projecting and retracting the stem. The arrangement is such that when the runner portion of the stem is sliding on a boll, the stem is prevented from turning on its longitudinal axis and the hooks are out of contact with the boll. The stripper bar is in the position shown by Figure 3 and covers the pointed portions of the hooks when the stem is being projected. When the projection of the stem ceases, it is turned on its longitudinal axis until the boll is impaled by the hooks and the stripper bar is moved to the position shown by Figure 4 before the impalement of the boll, and held in that position until the stem is fully retracted. After the retraction of the stem, it is turned in the opposite direction to withdraw the hooks from the boll. The stripper bar remains in the position shown by Figure 4 until the hooks have been withdrawn, and prevents the boll from following the hooks during the withdrawal of the latter. The lateral pressure of the runner portion of the stem against the boll is sufficient to cause a portion of the boll to overhang a portion of the face 15 before the advancing hooks encounter the boll, the overhanging boll portion being in the path of the hooks, as indicated by Figure 3$^a$.

The word "boll" as used herein refers of course to the fibrous portion "fruit" or lint of a cotton boll.

Our improved stem is adapted to remove the fiber or fruit without injury to the plant, which is left in good condition for a subsequent picking or pickings.

We claim:

1. A picker stem comprising an elongated rod having a tapered nose portion, a substantially semi-cylindrical side, and a substantially flat side extending inward from the inner end of the nose portion; and a plurality of separately formed arcuate pointed hooks overhanging the flat side, and provided with arcuate shanks, the semi-cylindrical side of the rod including spaced apart arcuate ridges alternating with arcuate grooves in which the arcuate shanks are secured, said ridges and shanks forming a substantially semi-cylindrical runner portion of the stem.

2. A picker stem as specified by claim 1, the said ridges and grooves being inclined relative to the longitudinal axis of the stem, to locate the points of the hooks farther from the outer end of the stem than the shanks, so that the hooks have a backward rake and are adapted to slide in contact with a boll, without catching the fibers thereof.

3. A picker stem as specified by claim 1, comprising also a stripper bar extending lengthwise of the stem and oscillatable on the rod to alternately expose the hooks and cover the pointed portions thereof, and means for oscillating the stripper.

In testimony whereof we have affixed our signatures.

JOSEPH BARDWELL.
HARRIS G. PROUTY.